(12) United States Patent
Sawada et al.

(10) Patent No.: US 10,676,029 B2
(45) Date of Patent: Jun. 9, 2020

(54) VIEWING DEVICE FOR VEHICLE

(71) Applicant: KABUSHIKI KAISHA TOKAI-RIKA-DENKI-SEISAKUSHO, Aichi (JP)

(72) Inventors: Kazuhiro Sawada, Aichi (JP); Nobuhiro Kudo, Aichi (JP); Hiroyuki Muto, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 124 days.

(21) Appl. No.: 15/757,709

(22) PCT Filed: Aug. 5, 2016

(86) PCT No.: PCT/JP2016/073165
§ 371 (c)(1),
(2) Date: Mar. 6, 2018

(87) PCT Pub. No.: WO2017/043235
PCT Pub. Date: Mar. 16, 2017

(65) Prior Publication Data
US 2019/0039520 A1 Feb. 7, 2019

(30) Foreign Application Priority Data
Sep. 8, 2015 (JP) .................... 2015-176926

(51) Int. Cl.
  *B60R 1/06* (2006.01)
  *B60R 1/12* (2006.01)
  *B60Q 1/24* (2006.01)
(52) U.S. Cl.
  CPC .............. *B60R 1/06* (2013.01); *B60Q 1/24* (2013.01); *B60R 1/12* (2013.01); *B60R 1/1207* (2013.01); *B60R 2001/1253* (2013.01)

(58) Field of Classification Search
None
See application file for complete search history.

(56) References Cited

U.S. PATENT DOCUMENTS

2017/0210282 A1* 7/2017 Rodriguez Barros . G03B 21/00

FOREIGN PATENT DOCUMENTS

| JP | 2002-096682 A | 4/2002 |
| JP | 2012-091673 A | 5/2012 |

OTHER PUBLICATIONS

International Search Report and Written Opinion issued in the corresponding application PCT/JP2016/073165 dated Nov. 1, 2016.

* cited by examiner

*Primary Examiner* — Jennifer D. Carruth
(74) *Attorney, Agent, or Firm* — Roberts Calderon Safran & Cole P.C.

(57) ABSTRACT

An opening (irradiation opening (90A)), which faces an opening portion of an outer peripheral member and through which an optical axis of an optical member (lamp unit (46)) passes, is formed in a trunk portion (88) that, together with a viewing means (door mirror) for assisting viewing by a vehicle occupant of a vehicle, is covered by the outer peripheral member (visor cover). Further, a wall portion (106), which runs along a peripheral wall of the opening portion and, at a vehicle rear side portion, faces the peripheral wall at a radial direction side, is formed at the trunk portion. Air, which enters into the opening portion while the vehicle is traveling, passes-through a flow path that is bent by the peripheral wall and the wall portion, and the flow rate is reduced, and noise is suppressed.

12 Claims, 8 Drawing Sheets

VIEWING DEVICE FOR VEHICLE

CROSS-REFERENCE TO RELATED APPLICATIONS

The present application is a U.S. National Phase of PCT/JP2016/073165 filed on Aug. 5, 2016 claiming priority to Japanese Patent Application No. 2015-176926 filed Sep. 8, 2015. The disclosure of the PCT Application is hereby incorporated by reference into the present Application.

TECHNICAL FIELD

The present invention relates to a vehicular visual recognition device that is provided at a vehicle exterior and that assists viewing by a vehicle occupant.

BACKGROUND ART

An outer mirror such as a door mirror or the like is provided at a vehicle as an exterior rearview mirror that assists viewing by a vehicle occupant.

Further, Japanese Patent Application Laid-Open (JP-A) No. 2012-091673 discloses a light emitting device that is provided at the interior of an outer mirror and that irradiates light toward the vehicle exterior from an opening portion that is formed in the visor cover of the outer mirror.

On the other hand, the visor cover of the door mirror receives airflow (wind) from the vehicle front side while the vehicle is traveling. Therefore, while the vehicle is traveling, if airflow advances straight through the visor cover interior from the interior of an illumination opening formed in the visor cover, noise such as wind noise and whistling and the like increases.

SUMMARY OF INVENTION

Technical Problem

The present invention was made in view of the above-described circumstances, and an object thereof is to provide a vehicular visual recognition device that can suppress generation of noise while a vehicle is traveling.

Solution to Problem

In order to achieve the above-described object, a vehicular visual recognition device relating to a first aspect of the present disclosure comprises: viewing means, which is mounted to a vehicle body, is disposed at a vehicle exterior, for assisting viewing by a vehicle occupant of a vehicle; a trunk portion in which is formed an opening through which an optical axis of an optical member passes; an outer peripheral member that is assembled from a vehicle front side and covers the trunk portion, and in which is formed an opening portion that faces the opening of the trunk portion and at whose periphery a peripheral wall is provided; and a wall portion that is provided at the trunk portion, and that, at a vehicle rear side portion of the opening portion, faces the peripheral wall at a radial direction side of the opening portion.

In accordance with the first aspect of the present disclosure, an opening portion, which faces the opening of the trunk portion, is formed in the outer peripheral member that is assembled from the vehicle front side and covers the trunk portion that accommodates the optical member. The optical axis of the optical member passes-through this opening portion. A wall portion, which faces the peripheral wall at a radial direction side which is a side in the direction of crossing-over the opening portion, is formed at the trunk portion at the vehicle rear side portion of the opening portion.

Air which, while the vehicle is traveling, flows into the opening portion formed in the outer peripheral member passes between the peripheral wall of the opening portion and the wall portion of the trunk portion, and the air advancing straight through the interior of the outer peripheral member is thereby suppressed. Due thereto, while the vehicle is traveling, the generation of noise such as wind noise or whistling or the like, which is due to the airflow that enters into the opening portion from the vehicle front side, can be suppressed.

A vehicular visual recognition device relating to a second aspect of the present disclosure comprises: viewing means, which is mounted to a vehicle body, is disposed at a vehicle exterior, for assisting viewing by a vehicle occupant of a vehicle; a trunk portion in which is formed an opening through which an optical axis of an optical member passes; an outer peripheral member that is provided at an outer periphery, and in which an opening hole is formed; an outer peripheral part that covers the opening hole, and in which is formed an opening portion that faces the opening of the trunk portion and at whose periphery a peripheral wall is provided; and a wall portion that is provided at the trunk portion, and that, at a vehicle rear side portion of the opening portion, faces the peripheral wall at a radial direction side of the opening portion.

In accordance with the second aspect of the present disclosure, the opening hole is formed in the outer peripheral member. The trunk portion is covered due to this opening hole being covered by the outer peripheral part. The opening portion, which faces the opening of the trunk portion, is formed in the outer peripheral part that covers the opening hole. The optical axis of the optical member passes-through this opening portion. Further, the wall portion, which faces the peripheral wall at a radial direction side that is a side in the direction of crossing-over the opening portion, is formed at the trunk portion at the vehicle rear side portion of the opening portion. Due thereto, while the vehicle is traveling, the generation of noise such as wind noise or whistling or the like, which is due to the airflow that enters into the opening portion from the vehicle front side, can be suppressed.

In a vehicular visual recognition device relating to a third aspect of the present disclosure, at an axial direction side of the opening portion, either the trunk portion and the peripheral wall of the opening portion face one another, or the outer peripheral member and the wall portion of the trunk portion face one another, or the trunk portion and the peripheral wall of the opening portion face one another and the outer peripheral member and the wall portion of the trunk portion face one another.

In accordance with the third aspect of the present disclosure, with the direction that runs along the opening direction of the opening portion being the axial direction, at an axial direction side of the opening portion, either the trunk portion and the peripheral wall of the opening portion face one another, or the outer peripheral member and the wall portion of the trunk portion face one another, or the trunk portion and the peripheral wall of the opening portion face one another and the outer peripheral member and the wall portion of the trunk portion face one another. Due thereto, while the vehicle is traveling, the generation of noise due to airflow that flows into the opening portion from the vehicle front side can be suppressed.

In a vehicular visual recognition device relating to a fourth aspect of the present disclosure, one of the peripheral wall or the wall portion is provided as a plurality, and another of the peripheral wall or the wall portion faces the one of the peripheral wall or the wall portion at radial direction both sides of the opening portion.

In accordance with the fourth aspect of the present disclosure, for example, in a case in which plural peripheral walls are provided, the peripheral walls are provided so as to face the wall portion at the respective radial direction both sides of the opening portion. Further, in a case in which plural wall portions are provided, the wall portions are provided so as to face the peripheral wall at the respective radial direction both sides of the opening portion. Due thereto, the air which, while the vehicle is traveling, flows into the opening portion formed in the outer peripheral member advancing straight through the interior of the outer peripheral member is suppressed even more, and therefore, the generation of noise such as wind noise or whistling or the like can be suppressed.

In a vehicular visual recognition device relating to a fifth aspect of the present disclosure, a communication hole that communicates a lowermost end of the trunk portion interior and the trunk portion exterior is formed.

In accordance with the fifth aspect of the present disclosure, the communication hole is formed in the lower end portion of the distal end portion inner surface of the trunk portion. Due thereto, even if water droplets or the like enter into the trunk portion, the water droplets or the like are discharged-out from the communication hole to the trunk portion exterior. Therefore, even though an optical member is disposed within the trunk portion, the optical member being affected by moisture that has entered into the trunk portion interior is suppressed.

Advantageous Effects of Invention

In accordance with the present invention, there is the effect that the generation of noise while the vehicle is traveling can be suppressed.

DESCRIPTION OF EMBODIMENTS

Figure 1A:
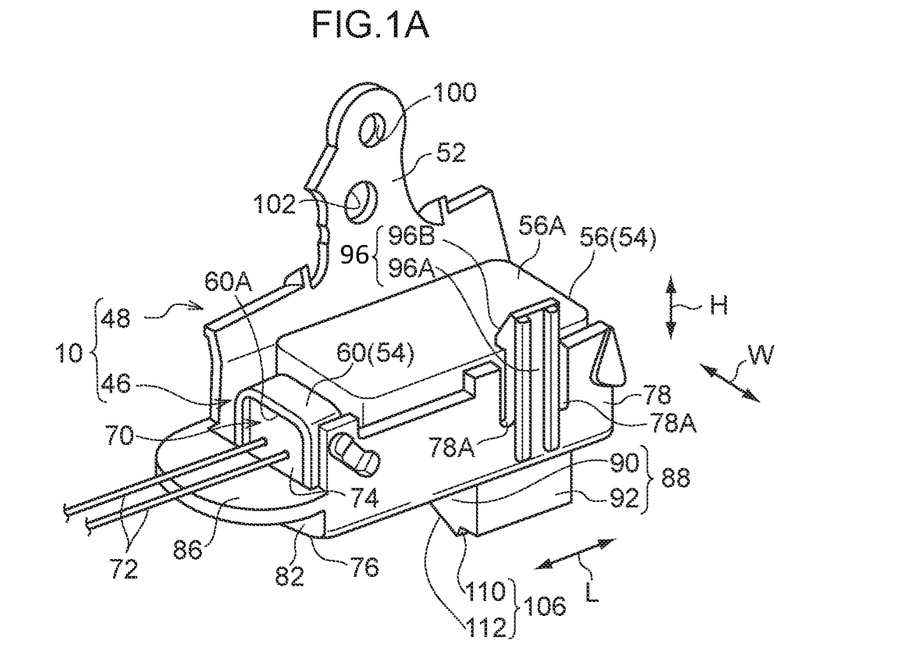
FIG. 1A is a schematic perspective view that is seen from an upper side and shows an illuminating device for a vehicle relating to a present embodiment.
Figure 1B:
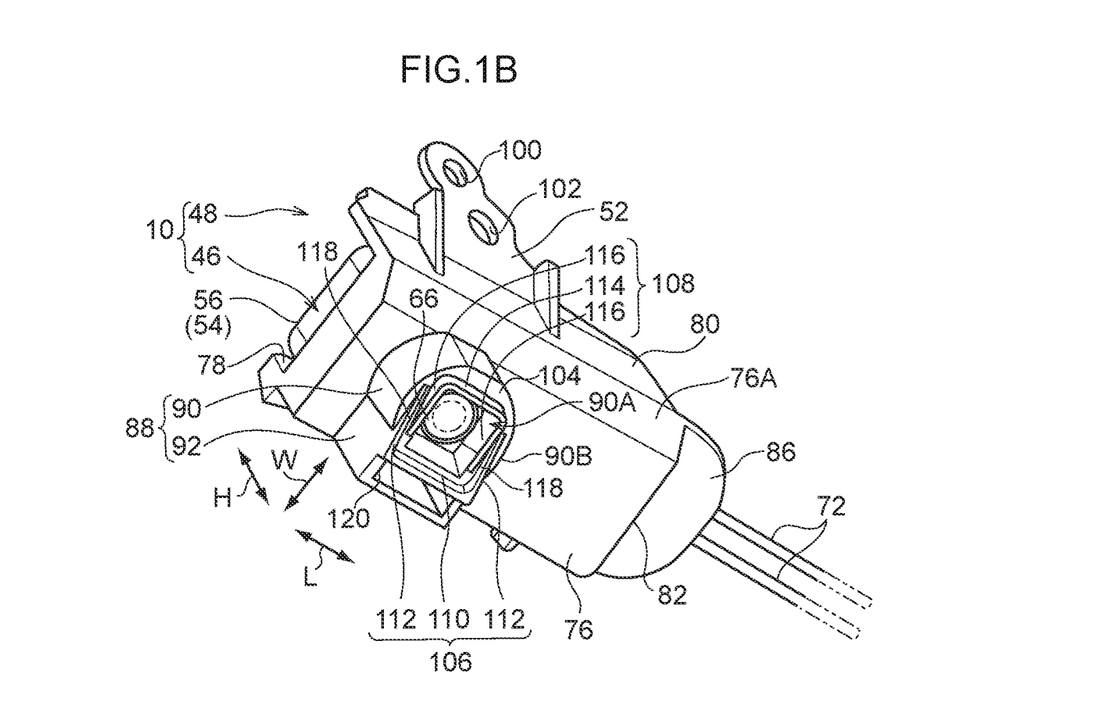
FIG. 1B is a schematic perspective view that is seen from a lower side and shows the illuminating device for a vehicle relating to the present embodiment.
Figure 2:
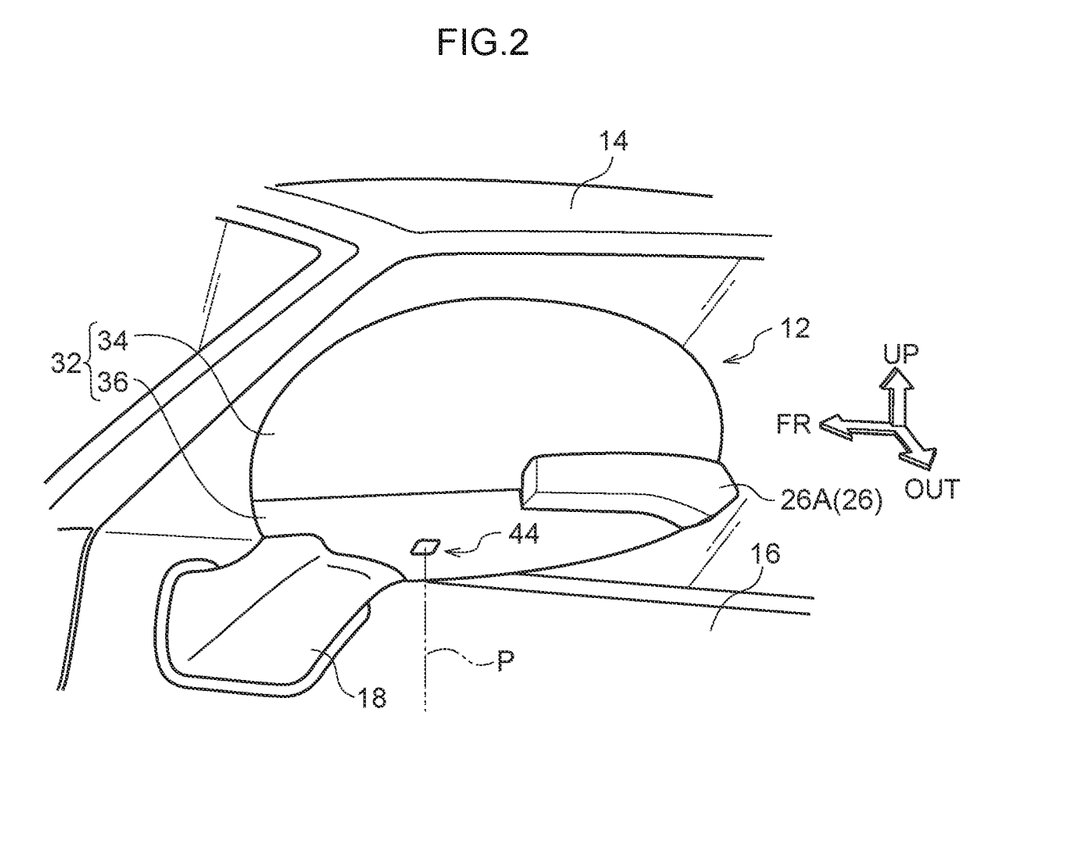
FIG. 2 is a schematic perspective view that is seen obliquely from a vehicle right front side and that shows an example of a door mirror at which the illuminating device for a vehicle is provided.
Figure 3:
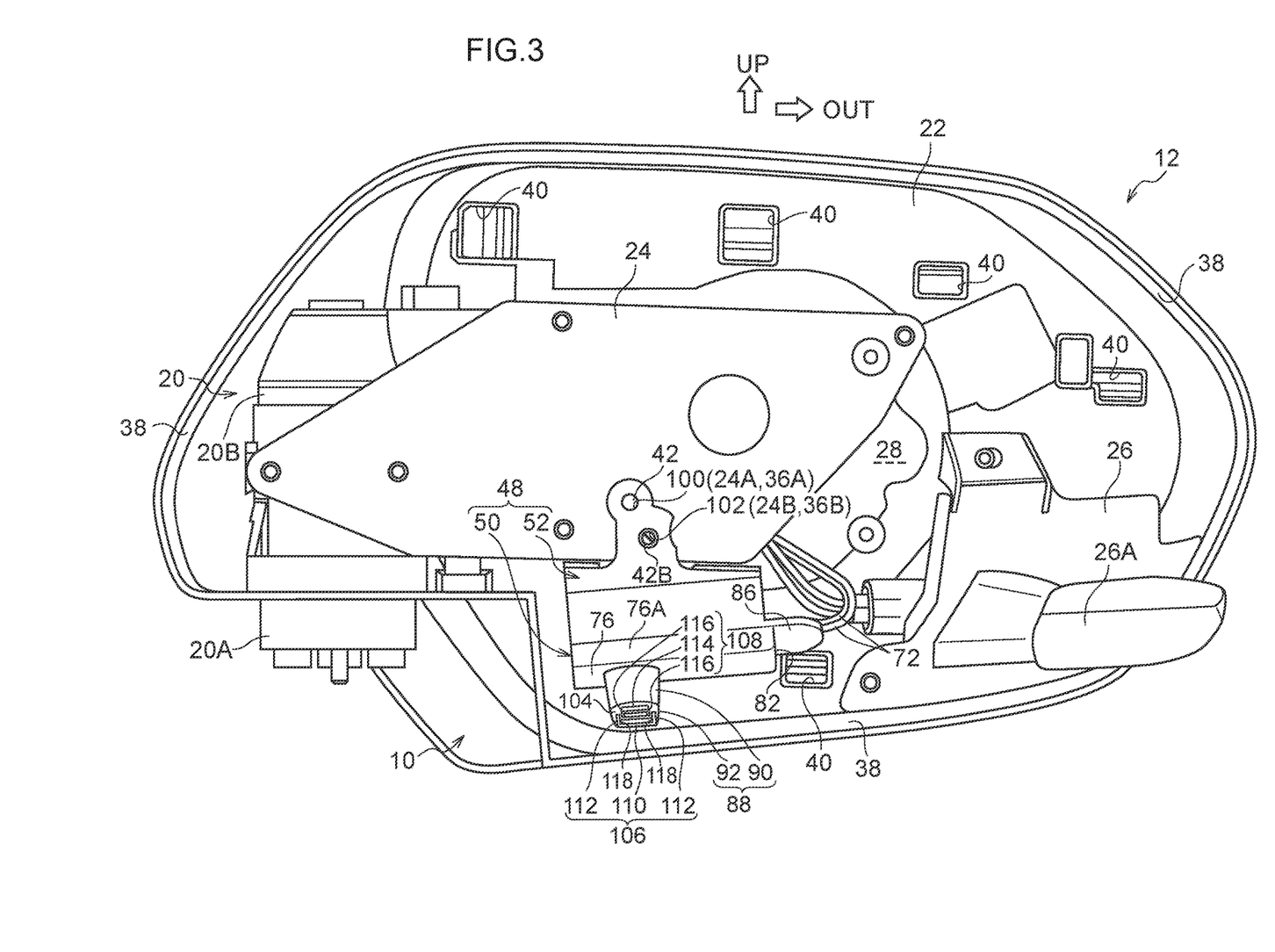
FIG. 3 is a schematic plan view in which a visor body of the door mirror is seen from a vehicle front side.

An embodiment of the present invention is described in detail hereinafter with reference to the drawings. FIG. 1A and FIG. 1B show an illuminating device 10 for a vehicle relating to the present embodiment. Further, a door mirror 12, at which the illuminating device 10 for a vehicle is provided, and main portions of a vehicle 14, to which the door mirror 12 is mounted, are shown in FIG. 2 in a schematic perspective view seen obliquely from a right front side. A schematic plan view of the interior of the door mirror 12 as seen from the vehicle front side is shown in FIG. 3. Note that, in the following description, the front side in the vehicle longitudinal direction is indicated by arrow FR, the upper side in the vehicle vertical direction is indicated by arrow UP, and the outer side in the vehicle transverse direction is indicated by arrow OUT.

In the present embodiment, the door mirror 12, which is an example of an exterior rearview mirror, is used as a vehicular visual recognition device that is provided at the vehicle exterior and that assists viewing by a vehicle occupant. As shown in FIG. 2, the door mirror 12 is rotatably mounted to a stay 18 that is fixed to a door (a front side door) 16 of the vehicle 14. The door mirror 12 may be a manual retracting type, or may be an electric retracting type, and, in the present embodiment, an electric retracting type is used as an example.

A schematic plan view in which the interior of the door mirror 12 is seen from the vehicle front side is shown in FIG. 3. A retracting mechanism (retractor) 20 is provided at the door mirror 12. The retracting mechanism 20 has a stand 20A and a rotating body 20B. The stand 20A is fixed to the stay 18 (see FIG. 2), and the rotating body 20B is rotatably supported at the stand 20A.

The door mirror 12 has a visor body 22, and the retracting mechanism 20 is mounted to the visor body 22. The rotating body 20B of the retracting mechanism 20 is fixed to the vehicle front side at the retracted position of the door mirror 12 (the inner side in the vehicle transverse direction at the unfolded position). Due thereto, the door mirror 12 is supported at the stay 18 via the retracting mechanism 20. Due to the retracting mechanism 20 being operated electrically or manually, the door mirror 12 is rotated with respect to the stand 20A around an axis that runs along the vertical direction. Note that, hereinafter, description is given of a state in which the door mirror 12 has been moved to the unfolded position.

As shown in FIG. 3, a reinforcement 24, which is made of metal and serves as a reinforcing member of the visor body 22, is mounted to the door mirror 12. Further, the reinforcement 24 is connected to the rotating body 20B that is mounted to the visor body 22, and improves the strength of connection of the rotating body 20B to the visor body 22. Further, as shown in FIG. 2 and FIG. 3, as an example, a turn lamp unit 26 is provided at the door mirror 12. The turn lamp unit 26 is mounted to the visor body 22 such that a turn lamp 26A is at the outer side in the vehicle transverse direction at the vehicle front side of the visor body 22.

Figure 4:
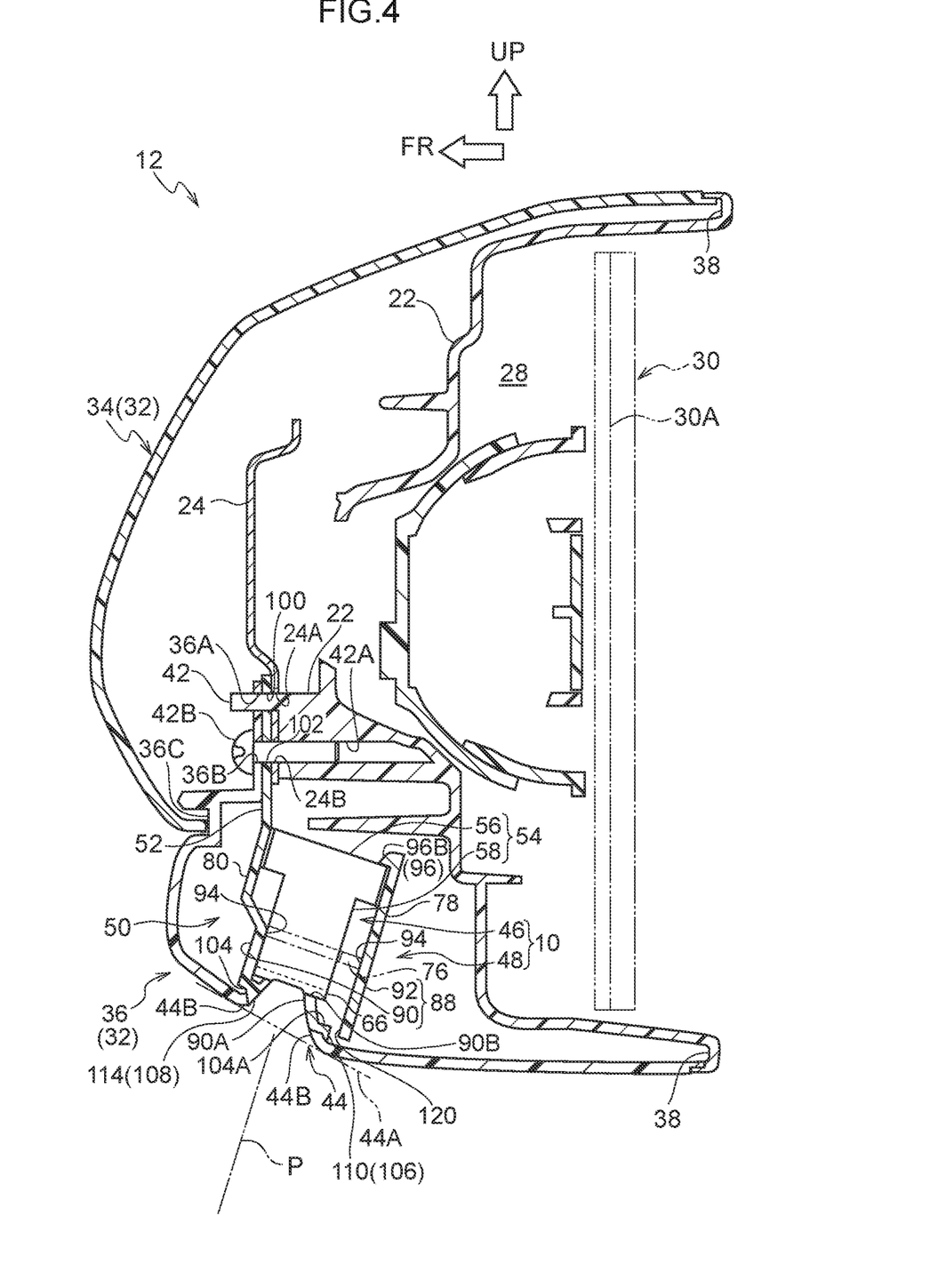
FIG. 4 is a cross-sectional view of main portions that shows a schematic cross-section along line IV-IV of FIG. 3.

A schematic cross-section of main portions of the door mirror 12 is shown in FIG. 4. An accommodating portion 28, which is concave and whose direction of opening faces the vehicle rear side (the side in the direction opposite arrow FR) is formed at the visor body 22 of the door mirror 12. A mirror (mirror body) 30 that serves as a viewing means is disposed so as to cover the opening of the accommodating portion 28. A reflecting surface 30A of the mirror 30 is directed toward the vehicle rear side. At the door mirror 12, due to an unillustrated mirror surface adjusting mechanism that is disposed within the accommodating portion 28 being operated, the mirror 30 (the reflecting surface 30A) is tilted, and the region at the vehicle rear side that is reflected in the mirror 30 is adjusted.

On the other hand, as shown in FIG. 2 and FIG. 4, the door mirror 12 has a visor cover 32 that serves as an outer peripheral member. In the present embodiment, as an example, the visor cover 32 is formed by an upper visor cover 34 that is at the vehicle upper side and a lower visor cover 36 that is at the vehicle lower side. Note that, in the present embodiment, as an example, the visor cover 32 that is divided into the upper visor cover 34 and the lower visor cover 36 is described as an example, but the upper and lower portions of the visor cover may be made to be integral.

As shown in FIG. 3 and FIG. 4, a groove portion 38 is formed at the visor body 22 over the substantially the entire periphery of the peripheral edge portion. As shown in FIG. 4, the groove portion 38 is formed by, for example, the peripheral edge portion of the visor body 22 being folded-over toward the vehicle front side. As shown in FIG. 3, plural mounting holes 40 are formed in the visor body 22 at predetermined positions.

Plural engaging claws that are not illustrated are formed at the upper visor cover 34 and the lower visor cover 36 at positions that respectively correspond to the mounting holes 40 of the visor body 22. Further, as shown in FIG. 4, the visor cover 32 is formed such that the lower end portion of the upper visor cover 34 overlaps the upper end portion of the lower visor cover 36.

As shown in FIG. 3 and FIG. 4, a reference pin 42 is formed so as to project-out from the visor body 22 at a predetermined position. A screw hole 42A is formed at a position adjacent to the reference pin 42. A through-hole 24A is formed in the reinforcement 24 at a position corresponding to the reference pin 42, and an insert-through hole 24B is formed in the reinforcement 24 at a position corresponding to the screw hole 42A. The reinforcement 24 is positioned with respect to and fixed to the visor body 22 due to the reference pin 42 being inserted in the through-hole 24A and by a screw 42B that is inserted-in from the insert-through hole 24B and is screwed-together with the screw hole 42A.

A through-hole 36A is formed in the lower visor cover 36 at the upper end portion that corresponds to the reference pin 42 of the visor body 22. An insert-through hole 36B is formed in the lower visor cover 36 at a position corresponding to the screw hole 42A. Further, a groove portion 36C is formed in the lower visor cover 36 at a portion corresponding to the lower end portion peripheral edge of the upper visor cover 34.

An unillustrated cut-out is formed in the lower visor cover 36 of the visor cover 32 relating to the present embodiment, at a position corresponding to the turn lamp 26A of the turn lamp unit 26. The turn lamp 26A is exposed on the lower visor cover 36 that covers the visor body 22 (see FIG. 2).

From here, the lower visor cover 36 of the visor cover 32 is moved from the vehicle front side toward the visor body 22, and the distal end of the lower end portion peripheral edge of the lower visor cover 36 is fit into the groove portion 38 of the visor body 22, and the unillustrated engaging claws are inserted into and engaged with the mounting holes 40 (see FIG. 3). At this time, the lower visor cover 36 is assembled and fixed to the visor body 22 due to the reference pin 42 being inserted into the through-hole 36A, the insert-through hole 36B being superposed on the screw hole 42A of the visor body 22, and the screw 42B that has been inserted into the insert-through hole 36B being screwed-together with the screw hole 42A.

Further, the upper visor cover 34 is assembled to the visor body 22 by being moved from the vehicle front side of the visor body 22 toward the visor body 22, and the distal end of the peripheral edge portion being fit-into the groove portion 38 of the visor body 22 and the groove portion 36C of the lower visor cover 36, and the unillustrated engaging claws being inserted into and engaged with the mounting holes 40 (see FIG. 3). Namely, at the door mirror 12, the upper visor cover 34 and the lower visor cover 36 are moved in parallel from the vehicle front side toward the visor body 22, and are assembled to the visor body 22, and the vehicle front side of the visor body 22 is covered by the upper visor cover 34 and the lower visor cover 36 (the visor cover 32).

On the other hand, as shown in FIG. 4, the illuminating device 10 for a vehicle that irradiates light is assembled to the door mirror 12 relating to the present embodiment. The illuminating device 10 for a vehicle is mounted to the visor body 22, and is covered by the visor cover 32. As shown in FIG. 2 and FIG. 4, at the door mirror 12, an illumination hole 44 that opens toward the vehicle lower side is formed in a predetermined position of the lower visor cover 36 that covers the vehicle front side of the visor body 22, and light irradiated from the illuminating device 10 for a vehicle is irradiated from the illumination hole 44 to the vehicle exterior of the vehicle 14. In the present embodiment, the illumination hole 44 that is formed in the lower visor cover 36 functions as an example of the opening portion of the outer peripheral member. Note that the illumination hole 44 that is formed in the lower visor cover 36 is described later.

As shown in FIG. 1A and FIG. 1B, the illuminating device 10 for a vehicle includes a lamp unit 46 and a holder bracket 48. A holder portion 50, in which the lamp unit 46 is accommodated and held, and a bracket portion 52, which extends from the holder portion 50, are formed integrally at the holder bracket 48. In the present embodiment, as shown in FIG. 3 and FIG. 4, due to the holder bracket 48 being fixed to a predetermined position of the visor body 22, the lamp unit 46 that is held by the holder portion 50 faces the illumination hole 44 of the lower visor cover 36 (see FIG. 4). In the present embodiment, the lamp unit 46 functions as an example of an optical member.

Figure 5A:
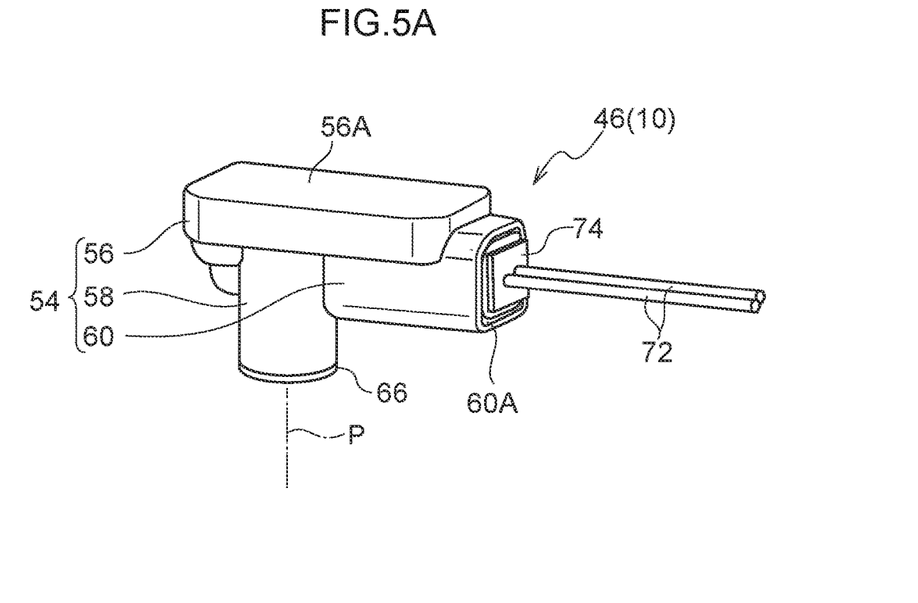
FIG. 5A is a schematic perspective view of a lamp holder.
Figure 5B:
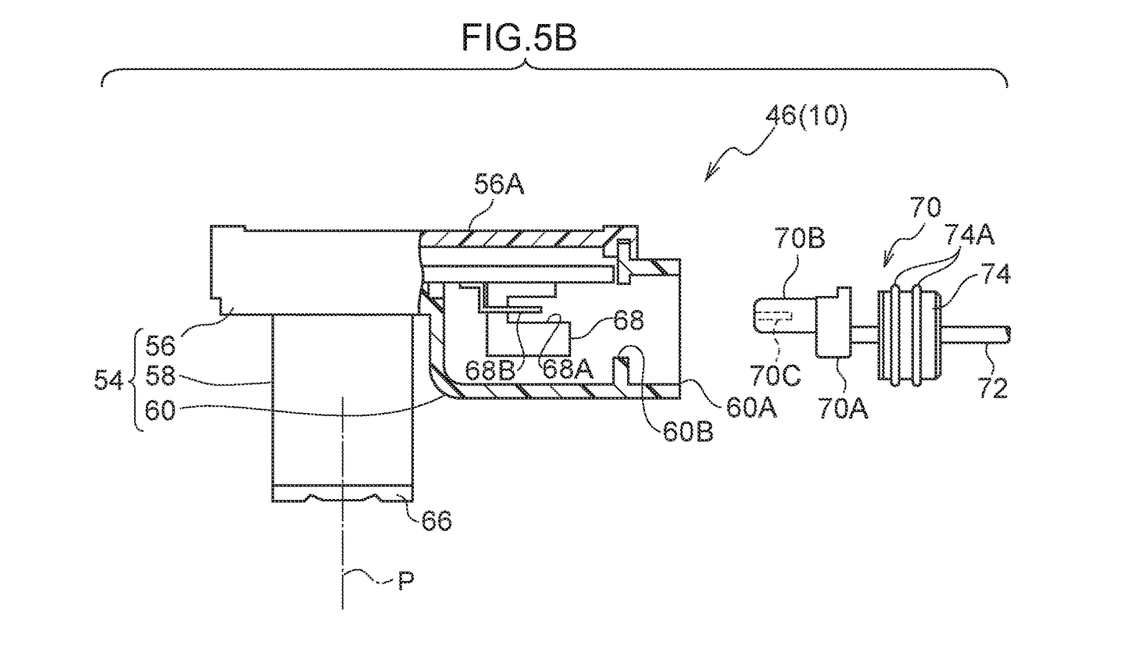
FIG. 5B is a cross-sectional view showing a schematic cross-section of main portions of the lamp holder.

An example of the lamp unit 46 relating to the present embodiment is shown in FIG. 5A and FIG. 5B. The lamp unit 46 has a housing 54. As an example, the housing 54 is formed by a substrate portion 56 that is shaped as a rectangular, thin box, a tube portion 58 that is cylindrical, and a socket portion 60 that is substantially rectangular parallelepiped. At the housing 54, at one surface of the substrate portion 56, the tube portion 58 is disposed at a length direction one end side such that the axial direction of the tube portion 58 runs along a direction intersecting the surface of the substrate portion 56, and the socket portion 60 is disposed at the length direction other end side. The respective interiors of the tube portion 58 and the socket portion 60 communicate with the interior of the substrate portion 56.

As shown in FIG. 5B, a circuit board 62 is disposed at the substrate portion 56 so as to extend over the tube portion 58 and the socket portion 60. An unillustrated light source that uses an LED (Light-Emitting Diode) or the like for example is disposed at the circuit board 62. An optical system that irradiates light, which was emitted from the light source, from a lens 66 is provided in the tube portion 58. Due thereto, the lamp unit 46 emits from the tube portion 58 light that has passed-through the lens 66. Note that, in the following description, the optical axis of the light emitted from the lamp unit 46 is denoted by the letter P. Further, for example, a display medium such as a film or the like on which a pattern is formed may be disposed at the optical system that is formed within the tube portion 58, and a projected image that corresponds to the pattern may be projected.

The end surface of the socket portion 60 that is at the side opposite the tube portion 58 side is open and an insertion opening 60A is formed thereat. A pin holder 68 whose outer shape is substantially rectangular parallelepiped is disposed at the interior of the socket portion 60. A concave portion 68A that opens in a rectangular shape is formed in one surface of the pin holder 68, and the opening of the concave portion 68A is directed toward the insertion opening 60A, and is mounted to the circuit board 62. Further, a pair of pin electrodes 68B project-out toward the opening side (the insertion opening 60A side) at the interior of the concave portion 68A at the pin holder 68, and the light source emits light due to lighting voltage that is applied to the pair of pin electrodes 68B.

A convex portion 60B is formed at the socket portion 60 between the insertion opening 60A and the pin holder 68 so as to narrow the cross-section of the opening. A connector 70 is inserted into this socket portion 60 from the insertion opening 60A. At the connector 70 are formed a base portion 70A, whose outer shape corresponds to the cross-sectional shape of the interior of the socket portion 60 that is narrowed by the convex portion 60B, and an insertion portion 70B, which projects-out in a shape that corresponds to the shape of the inner surface of the concave portion 68A of the pin holder 68. Further, electrodes 70C into which the pin electrodes 68B are inserted are provided within the insertion portion 70B at the connector 70, and lamp wires 72 that are connected to the electrodes 70C are pulled-out from the base portion 70A. Further, the connector 70 has a grommet 74 through which the lamp wires 72, which are pulled-out from the base portion 70A, are inserted. The grommet 74 is formed in a substantially rectangular parallelepiped shape whose outer shape corresponds to the cross-section of the opening of the insertion opening 60A, and, as an example, two projecting portions 74A are formed at the outer peripheral surface of the grommet 74.

Due to the connector 70 being inserted into the socket portion 60 from the insertion opening 60A, the pin electrodes 68B and the electrodes 70C are connected, and a supply of lighting voltage is possible via the lamp wires 72. In the state in which the pin electrodes 68B and the electrodes 70C are connected, the grommet 74 of the connector 70 is fit-in between the end surface of the insertion opening 60A and the convex portion 60B. At this time, the distal end portions of the projecting portions 74A abut the inner surface of the socket portion 60 and are elastically compressed, and the grommet 74 seals the socket portion 60.

Figure 6A:
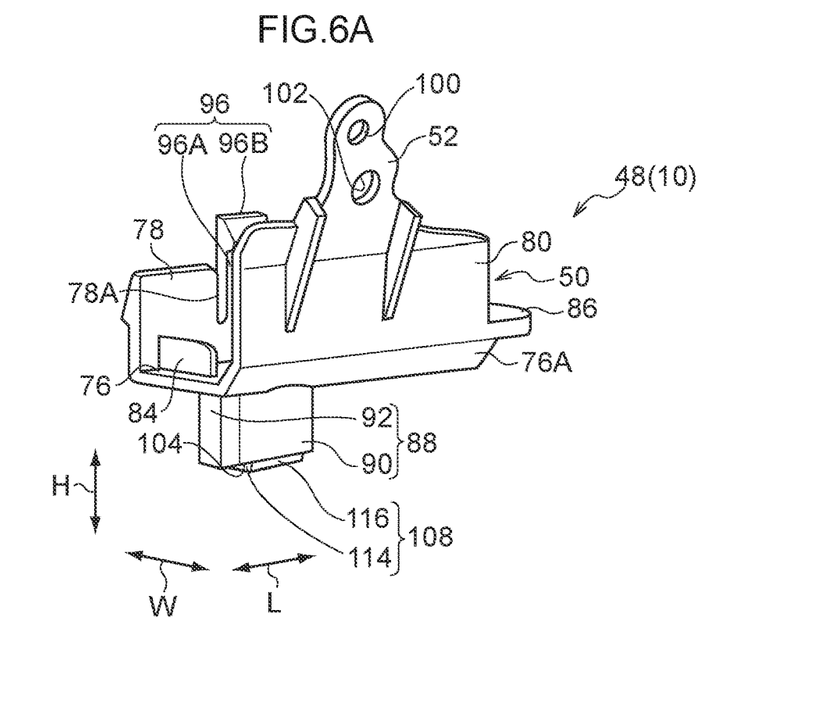
FIG. 6A is a schematic perspective view of a lamp bracket.
Figure 6B:
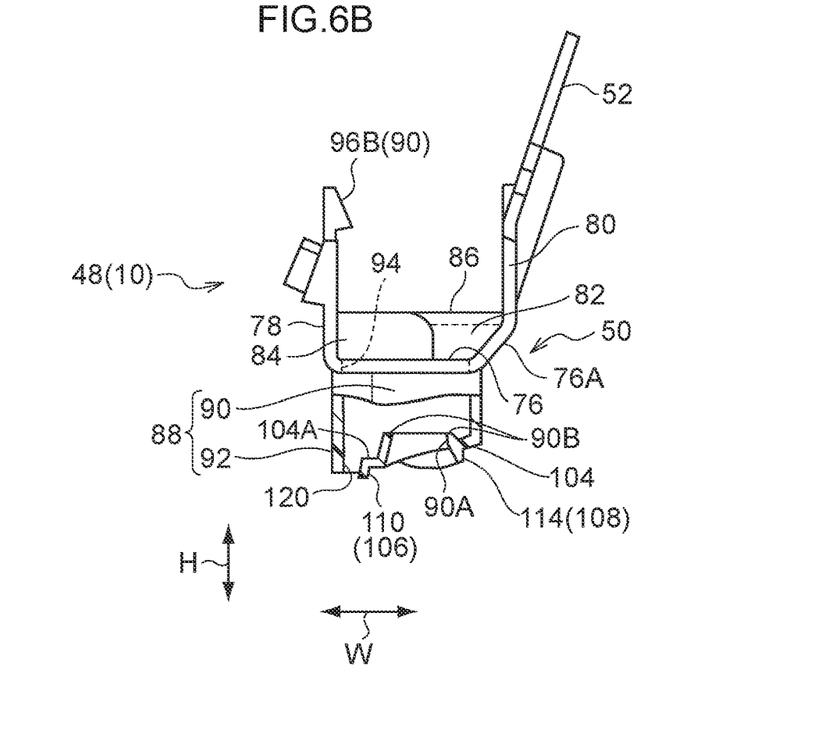
FIG. 6B is a schematic elevation in which the lamp holder is seen from one end side in the length direction.

FIG. 6A and FIG. 6B illustrate an example of the holder bracket 48 relating to the present embodiment. Here, the holder bracket 48 will be described with reference to FIG. 1A, FIG. 1B, FIG. 6A and FIG. 6B. The holder portion 50 of the holder bracket 48 has a bottom plate 76 that is formed in the shape of a flat plate that is substantially rectangular. Note that, in describing the holder bracket 48, description is given by using the bottom plate 76 of the holder portion 50 as a reference, and the length direction and the width direction of the bottom plate 76 are considered to be the length direction (the arrow L direction) and the width direction (the arrow W direction) of the holder bracket 48, and the direction heading from the bottom plate 76 toward the bracket portion 52 is considered to be the height direction (the arrow H direction) of the holder bracket 48.

As shown in FIG. 6A and FIG. 6B, at the holder portion 50, a side wall 78 stands erect at a width direction one end side of the bottom plate 76, and a side wall 80 stands erect at the width direction other end side. Further, a small wall 82 stands erect at a length direction one end side end portion of the bottom plate 76, and a small wall 84 stands erect at the other end side. The small wall 82 is formed so as to connect the lower end portions of the pair of side walls 78, 80. An extending portion 86, which extends in the direction opposite the bottom plate 76 and whose distal end portion is formed in a semicircular shape, is formed at the upper end of the small wall 82. The small wall 84 projects-out from the side wall 80 toward the side wall 78.

A trunk portion 88 whose interior is hollow is formed convexly at the holder portion 50 at the surface of the bottom plate 76 which surface is at the side opposite the bracket portion 52. At the trunk portion 88, a tubular body portion 90 that is cylindrical, and a box body portion 92 that is connected to the outer peripheral surface of the tubular body portion 90 at the side wall 78 side, are formed integrally. At the trunk portion 88, the inner diameter of the tubular body portion 90 is greater than the inner diameter of the tube portion 58 of the lamp unit 46. An opening 94 that communicates with the interior of the trunk portion 88 is formed in the bottom plate 76. Further, an irradiation opening 90A, which serves as an opening and through which the optical axis P passes, is formed at the distal end of the tubular body portion 90 at the trunk portion 88.

As shown in FIG. 1A and FIG. 1B, when the lamp unit 46 is installed in the holder portion 50, the tube portion 58 is made to face the opening 94 of the bottom plate 76, and the insertion opening 60A side of the socket portion 60 is made to face the small wall 82 side. Further, the lamp unit 46 is inserted between the side walls 78, 80 and between the small walls 82, 84. Moreover, the tube portion 58 is inserted into the tubular body portion 90 of the trunk portion 88 from the opening 94 (see FIG. 4 and FIG. 5B) and is placed on the bottom plate 76. Due thereto, at the lamp unit 46, the substrate portion 56 of the housing 54 is nipped between the side walls 78, 80, and the tube portion 58 and the socket portion 60 are nipped between the small walls 82, 84, and, due thereto, the optical axis P is positioned with respect to the holder portion 50 and the lamp unit 46 is positioned around the optical axis P. Further, at the lamp unit 46, due to the tube portion 58 being inserted in the trunk portion 88, an unillustrated opening (irradiation opening), which is formed in the tube portion 58 and through which light is transmitted, faces the irradiation opening 90A that is formed in the trunk portion 88.

Further, as shown in FIG. 1A and FIG. 6A, a holding claw 96 is formed at the side wall 78 at the holder portion 50. A supporting portion 96A is formed at the holding claw 96 between grooves 78A that are formed as a pair at the side wall 78. A claw portion 96B is formed at the distal end portion of the supporting portion 96A that projects-out upward of the upper end of the side wall 78. The holding claw 96 nips, between the bottom plate 76 and the claw portion 96B, the housing 54 of the lamp unit 46 that is placed on the bottom plate 76. Due thereto, the holder portion 50 holds the lamp unit 46 that is placed on the bottom plate 76.

As shown in FIG. 1A and FIG. 6B, at the holder portion 50, the height of the small wall 82 is a height that covers a portion of the insertion opening 60A of the socket portion 60 of the lamp unit 46. Due thereto, as shown in FIG. 1A and FIG. 1B, when the connector 70 is not reliably inserted in the insertion opening 60A of the socket portion 60, and the grommet 74 of the connector 70 is in a state of having popped-out from the insertion opening 60A, the grommet 74 abuts the upper end of the small wall 82 of the holder portion 50, and the socket portion 60 rises-up from the bottom plate 76. Accordingly, at the holder portion 50, it is clear whether the connector 70 is reliably installed in the socket portion 60 of the lamp unit 46. Further, at the holder portion 50, the extending portion 86 regulates the positions of the lamp wires 72 that are pulled-out from the insertion opening 60A of the lamp unit 46.

As shown in FIG. 6A and FIG. 6B, at the holder bracket 48, an inclined portion 76A is formed at the side wall 80 side of the bottom plate 76 of the holder portion 50, and the side wall 80 extends from the distal end of this inclined portion 76A. As shown in FIG. 1A, FIG. 1B, FIG. 6A and FIG. 6B, at the holder bracket 48, the bracket portion 52 extends at an incline at a predetermined angle from the upper end of the side wall 80. The distal end portion of the bracket portion 52 is made to be a shape in which two circular plates are connected so as to be eccentric. A through-hole 100 that corresponds to the reference pin 42 of the visor body 22 is formed in the axially central portion of one of the circular plates, and an insert-through hole 102 that corresponds to the screw hole 42A of the visor body 22 is formed in the axially central portion of the other circular plate (see FIG. 3 and FIG. 4 for both).

As shown in FIG. 3 and FIG. 4, the holder bracket 48 that holds the lamp unit 46 is positioned at and assembled to the visor body 22 due to the side wall 78 of the holder portion 50 being disposed at the visor body 22 side, and the reference pin 42 being inserted in the through-hole 100 of the bracket portion 52, and the screw 42B that is inserted in the insert-through hole 102 being screwed-together with the screw hole 42A. Due thereto, the holder bracket 48 is assembled to the visor body 22 such that the tubular body portion 90 of the trunk portion 88 that is provided at the holder portion 50 is at the vehicle front side and the box body portion 92 is at the vehicle rear side.

Further, as shown in FIG. 4, due to the holder bracket 48 being positioned at and assembled to the visor body 22, the irradiation opening 90A, which is formed at the trunk portion 88 (the tubular body portion 90) of the holder portion 50, faces the illumination hole 44 that is formed in the lower visor cover 36. Due thereto, the light that is emitted from the lamp unit 46 is irradiated from the illumination hole 44 to the vehicle exterior of the vehicle 14. The holder bracket 48 is formed such that, in the state in which the holder bracket 48 is positioned at the visor body 22, the slope of the optical axis P of the lamp unit 46 and the position at which the optical axis P reaches the ground are a slope and a position that are set in advance for the vehicle 14 to which the door mirror 12 is mounted. Due thereto, a predetermined region of the periphery of the vehicle 14 is illuminated by the illuminating device 10 for a vehicle that is provided at the door mirror 12.

By the way, as an example, the illumination hole 44 that is formed in the lower visor cover 36 of the door mirror 12 is inclined such that an opening plane 44A at the surface side of the lower visor cover 36 forms an acute angle with respect to the vehicle forward direction. Further, the lower visor cover 36 is formed so as to open such that at least the vehicle rear side of the peripheral edge of the illumination hole 44 is curved toward the inner portion side (the visor body 22 side) of the door mirror 12, and the respective sides of a distal end portion 44B that is curved form a rectangular shape that runs along the vehicle longitudinal direction or the vehicle transverse direction. In the present embodiment, the distal end portion 44B is an example of the peripheral wall of the opening portion.

It suffices for the distal end portion 44B to form the inner surface of the opening of the illumination hole 44, and for a wall surface to be formed at the radial direction outer side of the opening at least at the vehicle rear side of the illumination hole 44. Namely, the peripheral edge at the vehicle front side of the illumination hole 44 does not have to be curved. In this case, at the distal end portion 44B at the both sides in the vehicle transverse direction, it suffices for the curvature to gradually become smaller toward the vehicle front side. In the present embodiment, description is given in which the opening side end portion of a peripheral edge that is not curved toward the inner side of the lower visor cover 36 is considered to be the distal end portion 44B. The radial direction of the opening portion in the present invention indicates, in the present embodiment, the direction of crossing-over the opening that is formed by the distal end portion 44B of the illumination hole 44, and indicates the direction along the plane of the opening formed by the distal end portion 44B. Further, the axial direction of the opening portion in the present invention indicates, in the present embodiment, the direction of opening by the opening that is formed by the distal end portion 44B of the illumination hole 44.

On the other hand, as shown in FIG. 4 and FIG. 6B, a convex portion 90B that projects-out toward the inner portion side from the peripheral edge of the irradiation opening 90A is formed at the trunk portion 88 of the holder bracket 48. The planar shape of the convex portion 90B is ring-shaped, and the distal end of the tube portion 58 of the lamp unit 46 (in the present embodiment, as an example, the lens 66 shown in FIG. 5A and FIG. 5B) abuts the distal end portion of the convex portion 90B.

Further, as shown in FIG. 1B, FIG. 4 and FIG. 6B, a wall portion 106 that serves as a wall portion is formed at the trunk portion 88 of the holder bracket 48, at a bottom surface 104 that faces the illumination hole 44 of the lower visor cover 36. Further, an inner wall portion 108 that serves as a wall portion is formed at the bottom surface 104 at the trunk portion 88. The wall portion 106 faces the distal end portion 44B that is at the vehicle rear side of the illumination hole 44, and is formed along the outer periphery of the distal end portion 44B that is at the vehicle rear side. The inner wall portion 108 faces the distal end portion 44B that is at the vehicle front side of the illumination hole 44, and is formed along the inner periphery of the distal end portion 44B that is at the vehicle front side. Note that the outer periphery of the distal end portion 44B means the radial direction outer side of the opening of the illumination hole 44 at the distal end portion 44B, and the inner periphery of the distal end portion 44B means the inner side of the opening of the illumination hole 44 at the distal end portion 44B.

At the trunk portion 88, the bottom surface 104 that faces the illumination hole 44 is inclined so as to run along the plane of opening of the illumination hole 44 (the plane of opening that is formed by the distal end portion 44B). Namely, at the trunk portion 88, the height of the vehicle front side end portion of the tubular body portion 90 from the bottom plate 76 is lower than the height of the box body portion 92 side end portion that is at the vehicle rear side. The distal end portion 44B of the illumination hole 44 contacts the inclined bottom surface 104 of the trunk body 88.

The bottom portion of the box body portion 92 projects-out at the bottom surface 104 of the trunk portion 88, and a wall portion 110 that serves as the wall portion 106 is formed. Further, as shown in FIG. 1A and FIG. 1B, at the bottom surface 104 of the trunk portion 88, a pair of wall portions 112 that serve as the wall portion 106 are formed from the vehicle transverse direction both ends of the wall portion 110 toward the vehicle front side. The projecting heights of the wall portions 112 gradually become lower toward the vehicle front side. Due thereto, by the wall portion 110 and the pair of wall portions 112, the wall portion 106 surrounds the outer periphery of the distal end portion 44B that is at the vehicle rear side of the illumination hole 44. Further, at the wall portion 106, due to the distal end portion 44B of the illumination hole 44 contacting the bottom surface 104 of the trunk portion 88, and the wall portion 110 and the wall portions 112 respectively projecting-out from the bottom surface 104 of the trunk portion 88, the distal end portion 44B is at the vehicle front side, and the wall portions 110, 112 are at the vehicle rear side and face the distal end portion 44B.

A wall portion 114 that serves as the inner wall portion 108 is formed at the bottom surface 104 of the trunk portion 88 at the vehicle front side. The wall portion 114 projects-out from the bottom surface 104 and extends along the vehicle transverse direction. The length along the vehicle transverse direction of the wall portion 114 is shorter than the length along the vehicle transverse direction of the distal end portion 44B of the illumination hole 44. Further, a pair of wall portions 116, which serve as the inner wall portion 108 and extend toward the vehicle rear side, are formed at the both end portions that run along the vehicle transverse direction of the wall portion 114.

As shown in FIG. 4, the position along the vehicle vertical direction of the wall portion 114 that forms the inner wall portion 108 is higher than the vehicle rear side (the wall portion 110 side) of the bottom surface 104. Due thereto, at the time when the lower visor cover 36 is assembled to the visor body 22 from the vehicle front side, the wall portion 114 that serves as the inner wall portion 108 is prevented from interfering with the distal end portion 44B at the periphery of the illumination hole 44 of the lower visor cover 36.

Further, as shown in FIG. 1B, the respective wall portions 116 that form the inner wall portion 108 are inclined such that the projecting heights thereof from the bottom surface 104 of the trunk portion 88 gradually become lower toward the vehicle rear side, and the distal end portions at the vehicle rear side are further toward the inner side (the irradiation opening 90A side) than the wall portions 112. Due thereto, at the trunk portion 88, groove portions 118, into which the distal end portion 44B at the vehicle transverse direction of the illumination hole 44 is fit, are formed in the bottom surface 104 by the wall portions 112 and the wall portions 116. The groove directions of the groove portions 118 run along the vehicle longitudinal direction. Due to the lower visor cover 36 being assembled from the vehicle front side, the distal end portion 44B at the vehicle transverse direction both sides of the lower visor cover 36 is inserted in the groove portions 118.

On the other hand, as shown in FIG. 6B, the trunk portion 88 is inclined such that, at an inner surface 104A at the bottom surface 104 side that is the vehicle lower side, the vehicle rear side becomes lower along the inclination of the bottom surface 104. Further, at the trunk portion 88, a communication hole 120, which serves as a communication hole and communicates the trunk portion 88 interior and the trunk portion 88 exterior, is formed in the bottom portion of the box body portion 92 that is at the vehicle rear side and the vehicle lower side. The communication hole 120 opens at the vehicle rear side of the wall portion 110, and communicates the interior of the trunk portion 88 and the exterior of the trunk portion 88. Due thereto, the communication hole 120 functions as a drain hole. For example, due to water droplets that have entered into the trunk portion 88 interior flowing down along the inner surface 104A of the trunk portion 88, the water droplets are discharged-out from the communication hole 120 to the trunk portion 88 exterior.

In the state in which the lamp unit 46 is installed in the holder portion 50 of the holder bracket 48, the illuminating device 10 for a vehicle that is structured in this way is assembled to the visor body 22 before the lower visor cover 36. The holder bracket 48 that is assembled to the visor body 22 is disposed such that the wall portion 106 that is formed at the bottom surface 104 of the trunk portion 88 is at the vehicle rear side and the inner wall portion 108 is at the vehicle front side.

The turn lamp unit 26 is provided at the door mirror 12, and the turn lamp 26A of the turn lamp unit 26 is exposed from the visor cover 32. Therefore, for example, at the visor cover 32, an unillustrated cut-out is formed in the lower visor cover 36, and the turn lamp 26A is exposed from this cut-out.

Figure 7:
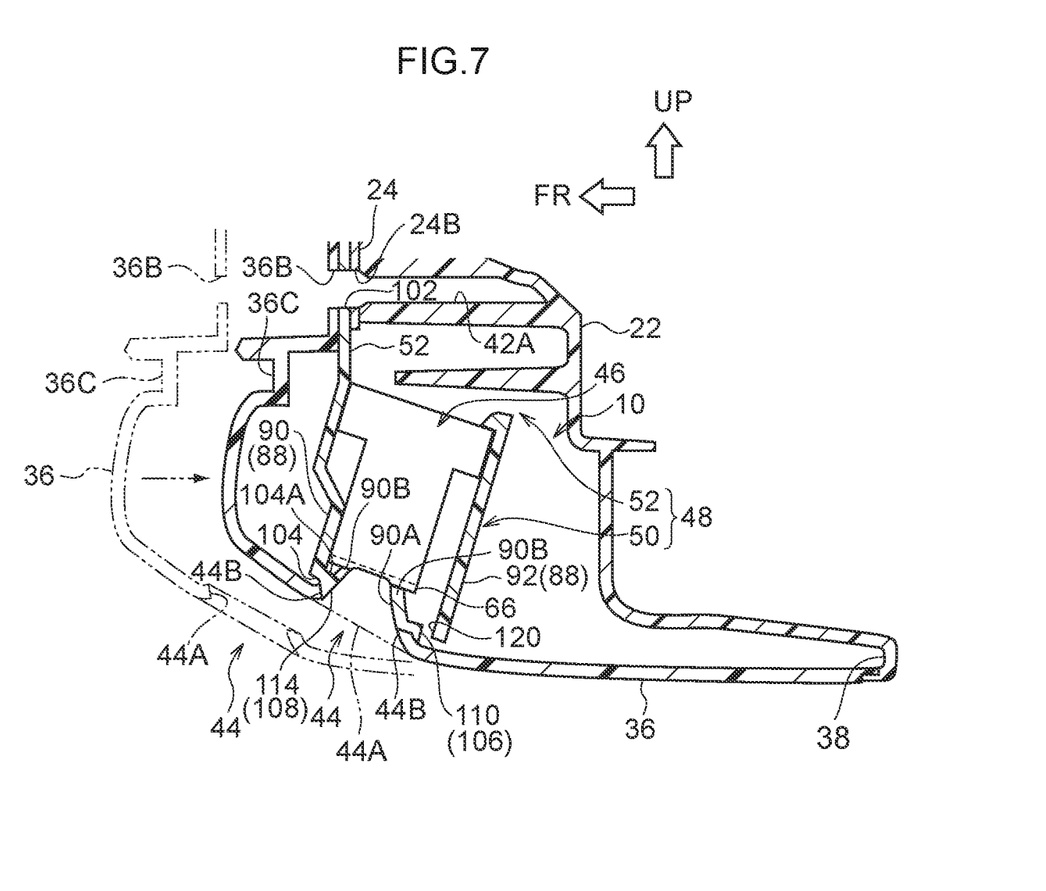
FIG. 7 is a cross-sectional view showing a schematic cross-section of main portions of a lower visor cover and the visor body.

From here, as shown in FIG. 7, the lower visor cover 36 is assembled from the vehicle front side. Note that, in FIG. 7, the lower visor cover 36 before being assembled to the visor body 22 (at the vehicle front side of the visor body 22) is shown by the two-dot chain line.

When the lower visor cover 36 is to be assembled from the vehicle front side, the lower visor cover 36 is moved substantially parallel from the vehicle front side toward the visor body 22. Here, at the lower visor cover 36, the illumination hole 44 is inclined with respect to the vehicle front side, and, at the holder bracket 48, the bottom surface 104 of the trunk portion 88 is inclined. Further, the position, along the vehicle vertical direction, of the wall portion 114 (the inner wall portion 108), which is at the vehicle front side of the bottom surface 104 of the trunk portion 88 of the holder bracket 48, is further upward than the position of the vehicle rear side of the bottom surface 104. Namely, the vehicle vertical direction position of the distal end of the wall portion 114 that is formed at the bottom surface 104 of the trunk portion 88 is higher than the upper end of the distal end portion 44B that is at the vehicle rear side of the illumination hole 44 of the lower visor cover 36. Accordingly, the lower visor cover 36 is assembled to the visor body 22 without the trunk portion 88 of the holder bracket 48 interfering with the distal end portion 44B of the illumination hole 44.

Further, the vehicle rear side of the distal end portion 44B of the illumination hole 44 of the lower visor cover 36, which has been assembled to the visor body 22 together with the lamp unit 46, abuts the vehicle front side surface of the wall portion 110 that forms the wall portion 106 of the trunk portion 88. Further, the vehicle front side of the distal end portion 44B of the illumination hole 44 abuts the vehicle front side surface of the wall portion 114 that forms the inner wall portion 108 of the trunk portion 88. Moreover, the vehicle transverse direction both sides of the distal end portion 44B of the illumination hole 44 are fit into the groove portions 118, and either are nipped between the wall portions 112 that form the wall portion 106 and the wall portions 116 that form the inner wall portion 108, or face the wall portions 112 or the wall portions 116.

Accordingly, at the vehicle rear side, the distal end portion 44B of the illumination hole 44 faces the wall portions 110, 112 that form the wall portion 106, and the vehicle rear side is surrounded by the wall portion 106. Further, at the vehicle rear side, the distal end portion 44B that is at the vehicle front side of the illumination hole 44 faces the wall portions 114, 116 that form the inner wall portion 108, and surrounds the vehicle front side of the inner wall portion 108 that is formed at the bottom surface 104 of the trunk portion 88.

At the door mirror 12, due to the vehicle 14 traveling, the visor cover 32 (the upper visor cover 34 and the lower visor cover 36) receives traveling wind (airflow), and air (airflow) enters into the illumination hole 44 of the lower visor cover 36. At the lower visor cover 36, due to the amount of air, which enters into the illumination hole 44 and heads from the illumination hole 44 toward the vehicle rear side of the interior of the lower visor cover 36, becoming large, noise such as so-called whistling or wind noise or the like is generated.

Here, at the holder bracket 48, the wall portion 106 that is formed at the bottom surface 104 of the trunk portion 88 faces the vehicle rear side surface of the distal end portion 44B of the illumination hole 44 so as to contact this vehicle rear side surface. Due thereto, the air that has entered into the illumination hole 44 passes through a flow path that has been made narrow and bent by the distal end portion 44B of the illumination hole 44 and the wall portion 106, and the amount thereof that slips-through toward the vehicle rear side of the interior of the lower visor cover 36 is extremely small. For example, in a case in which the air that has entered into the illumination hole 44 slips-through toward the vehicle rear side of the lower visor cover 36 interior, the direction thereof is changed in a vicinity of the bottom surface 104 of the trunk portion 88, and, thereafter, the direction is changed at the base of the wall portion 106, and moreover, the direction is changed at the base of the inner surface (the distal end portion 44B) of the lower visor cover 36. Accordingly, at the door mirror 12, the generation of noise, while the vehicle is traveling, that is caused by the illumination hole 44 formed in the lower visor cover 36 is suppressed.

The distal end portion 44B that is at the vehicle rear side is included in the range where the wall portion 106 surrounds the distal end portion 44B of the illumination hole 44. Further, in the present embodiment, the range that the wall portion 106 surrounds is made to be, for the distal end portion 44B at the vehicle transverse direction, up to the intermediate portion along the vehicle longitudinal direction. However, at the illumination hole 44 that is rectangular, the range may include the entire region along the vehicle longitudinal direction for the distal end portion 44B at the vehicle transverse direction of the illumination hole 44.

Further, the illumination hole is not limited to a rectangular shape, and may be a circular shape. In this case, for the distal end portion that forms the illumination hole, it suffices to form a wall portion at the vehicle rear side of the distal end portion so as to surround the distal end portion over half of the periphery of the illumination hole.

At the door mirror 12 relating to the present embodiment, there is no need to form, at the surface of the lower visor cover 36, a projecting portion or the like for suppressing noise while the vehicle is traveling. Therefore, a good design is obtained, and the design and the like are not subjected to limitations.

Further, at the holder bracket 48, the communication hole 120 is provided at the trunk portion 88 that faces the illumination hole 44. Therefore, even if moisture does enter into the trunk portion 88 interior, the moisture that has entered-in can be reliably discharged. Due thereto, for example, there are cases in which the lens 66 and the like that are provided at the tube portion 58 of the lamp unit 46 are mounted by using metal vapor deposition or the like, and, if moisture sticks to the interior of the trunk portion 88 in which the tube portion 58 is disposed, defects in mounting may arise. However, by discharging moisture (water droplets) by using the communication hole 120, the occurrence of such defects can be suppressed over a long time.

Figure 8A:
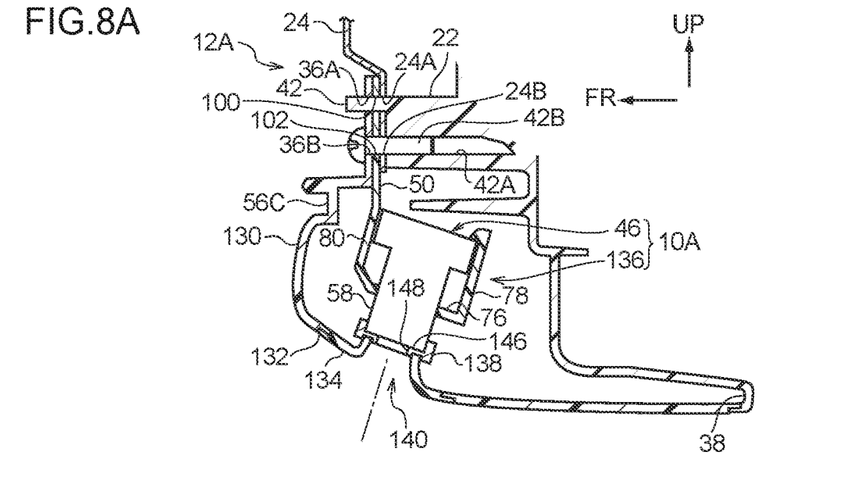
FIG. 8A is a cross-sectional view showing a cross-section of main portions in a vicinity of an illumination hole relating to a modified example of mounting an illuminating device for a vehicle, and shows a state in which the illuminating device for a vehicle is mounted.
Figure 8B:
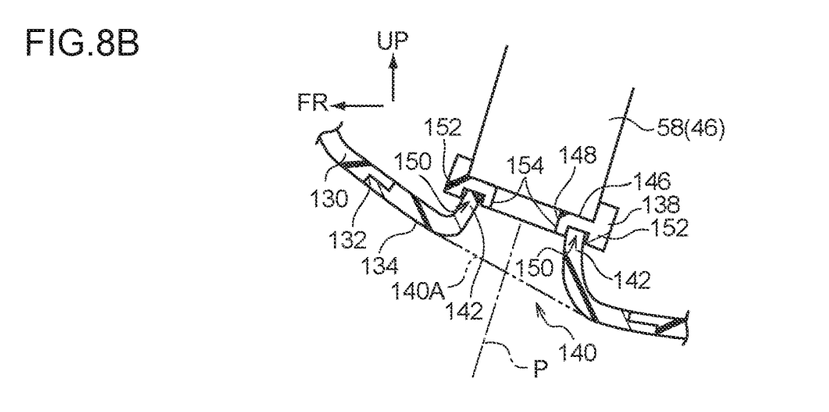
FIG. 8B is a cross-sectional view showing a cross-section of the main portions in the vicinity of the illumination hole relating to the modified example of mounting the illuminating device for a vehicle, and shows the main portions of FIG. 8A in an enlarged manner.
Figure 8C:
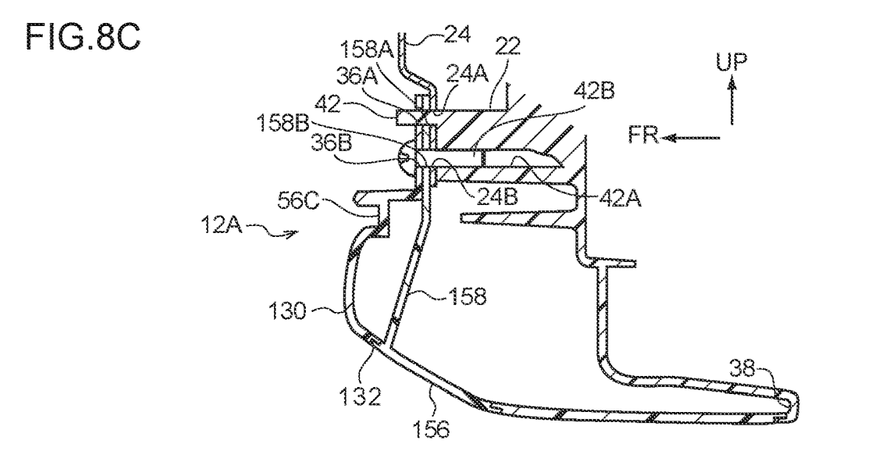
FIG. 8C is a cross-sectional view showing a cross-section of the main portions in the vicinity of the illumination hole relating to the modified example of mounting the illuminating device for a vehicle, and shows a non-mounted state of the illuminating device for a vehicle.

Note that the above description illustrates an example and does not limit the structure of the present invention, and various types of accommodations are possible. Here, another example (a modified example) of the present invention is described with reference to FIG. 8A through FIG. 8C. Note that FIG. 8A illustrates main portions of a door mirror relating to the modified example (hereinafter called door mirror 12A) and an illuminating device for a vehicle (hereinafter called illuminating device 10A for a vehicle) that is provided at the door mirror 12A. FIG. 8B illustrates a portion of FIG. 8A in an enlarged manner. Further, FIG. 8C illustrates a non-installed state of the illuminating device 10A for a vehicle.

A lower visor cover 130, which serves as an outer peripheral member and covers the vehicle front side of the door mirror 12A, is used instead of the lower visor cover 36. The lower visor cover 130 differs from the lower visor cover 36 with regard to the point that a region that includes the region that faces the lamp unit 46 is cut-away, and an opening portion 132 that serves as an opening hole is formed. Further, at the lower visor cover 130, when the illuminating device 10A for a vehicle is to be assembled to the door mirror 12A, a cover 134 that serves as an outer peripheral part is used. Further, the illuminating device 10A for a vehicle, which is assembled to the door mirror 12A and in which the lower visor cover 130 is used, has the lamp unit 46, a holder bracket 136 that holds the lamp unit 46, and a cap member 138 that serves as a covering member.

The cover 134 is formed in a shape that corresponds to the opening portion 132 of the lower visor cover 130, and is fit in the opening portion 132 so as to cover the opening portion 132 of the lower visor cover 130. An illumination hole 140 serving as an opening portion is formed in the cover 134 instead of the illumination hole 44. In the state in which the lower visor cover 130 is assembled to the visor body 22, at the illumination hole 140, an opening plane 140A at the surface side of the cover 134 is formed at an angle that is an acute angle with respect to the vehicle forward direction. The peripheral edge portion of the illumination hole 140 is curved toward the inner side of the lower visor cover 130. An opening that is rectangular for example is formed within the lower visor cover 130 by a distal end portion 142 that is curved. In the modified example, the distal end portion 142 functions as an example of the peripheral wall of the opening portion.

On the other hand, the holder bracket 136 that is used in the illuminating device 10A for a vehicle differs from the holder bracket 48 with respect to the point that the trunk portion 88 is not provided. Further, at the holder bracket 136, a through-hole 144 is formed in the bottom plate 76. The inner diameter of the through-hole 144 corresponds to the outer shape of the tube portion 58 of the lamp unit 46. The lamp unit 46 is positioned and held at the holder bracket 136 due to the tube portion 58 being fit into the through-hole 144. In the modified example, the tube portion 58 of the lamp unit 46 functions as an example of the trunk portion, and an unillustrated opening (irradiation opening), which is formed in the tube portion 58 and through which light is transmitted, functions as an example of the opening of the trunk portion.

Further, the cap member 138 is interposed between the lamp unit 46 and the distal end portion 142 of the illumination hole 140. As shown in FIG. 8A, for example, the cap member 138 is formed such that the outer shape thereof is a cylindrical shape. A concave portion 146, into which the distal end of the tube portion 58 of the lamp unit 46 is fit, is formed in one end surface of the cap member 138. Further, at the cap member 138, a through-hole 148 is formed in the bottom portion of the concave portion 146. At the illuminating device 10A for a vehicle, the distal end portion of the tube portion 58 of the lamp unit 46 is fit into the concave portion 146 of the cap member 138, and the cap member 138 is installed on the lamp unit 46, and light is irradiated from the through-hole 148 of the cap member 138.

Further, at the cap member 138, a groove portion 150 is formed in the end surface that is at the side opposite the concave portion 146. The groove portion 150 is formed such that the planar shape thereof is a shape corresponding to the shape in which the distal end portion 142 of the illumination hole 140 of the cover 134 is formed (e.g., a rectangular shape). The distal end portion 142 of the illumination hole 140 is fit into the groove portion 150.

Due to the groove portion 150 being formed at the cap member 138, a wall portion 152, which faces the outer peripheral surface side of the distal end portion 142 of the illumination hole 140, and an inner wall portion 154, which faces the inner peripheral surface side of the distal end portion 142 of the illumination hole 140, are formed. In the modified example, the wall portion 152 and the inner wall portion 154 function as examples of the plural wall portions.

At the illuminating device 10A for a vehicle, the cap member 138 is fit-in the distal end portion of the tube portion 58 in a state in which the lamp unit 46 is installed in and held at the holder bracket 136. The holder bracket 136 is assembled to the visor body 22 in a state in which the holder bracket 136 holds the lamp unit 46. The lower visor cover 130 is assembled to the visor body 22 in a state in which the cover 134 is not fit into the opening portion 132.

Here, at the holder bracket 48, the wall portion 106 that is formed at the bottom surface 104 of the trunk portion 88 faces the vehicle rear side surface of the distal end portion 44B of the illumination hole 44 so as to contact this vehicle rear side surface. Due thereto, the air that has entered into the illumination hole 44 passes through a flow path that has been made narrow and bent by the distal end portion 44B of the illumination hole 44 and the wall portion 106, and the amount thereof that slips-through toward the vehicle rear side of the interior of the lower visor cover 36 is extremely small. For example, in a case in which the air that has entered into the illumination hole 44 slips-through toward the vehicle rear side of the lower visor cover 36 interior, the direction thereof is changed in a vicinity of the bottom surface 104 of the trunk portion 88, and, thereafter, the direction is changed at the base of the wall portion 106, and moreover, the direction is changed at the base of the inner surface (the distal end portion 44B) of the lower visor cover 36. Accordingly, at the door mirror 12, the generation of noise, while the vehicle is traveling, that is caused by the illumination hole 44 formed in the lower visor cover 36 is suppressed.

At the lower visor cover 130 in which the cover 134 is fit, due to the vehicle 14 traveling, airflow flows into the illumination hole 140 of the cover 134. Here, the cap member 138 is installed on the tube portion 58 of the lamp unit 46, and the illuminating device 10A for a vehicle is connected to the distal end portion 142 of the illumination hole 140 via the cap member 138, and the wall portion 152 faces the outer peripheral side of the distal end portion 142 of the illumination hole 140, and the inner wall portion 154 faces the inner peripheral side.

Due thereto, a narrow and bent flow path is formed for the air that has entered into the illumination hole 140. For example, at the time when the air that has entered into the illumination hole 140 slips-through toward the vehicle rear side, the air passes between the inner wall portion 154 of the cap member 138 and the distal end portion 142 of the illumination hole 140, and circles-around toward the vehicle rear side of the distal end portion 142, and, moreover, passes between the distal end portion 142 and the wall portion 152 of the cap member 138. Accordingly, at the door mirror 12A, the amount of air, which enters into the illumination hole 140 and slips-through toward the vehicle rear side within the lower visor cover 130, is reduced, and the generation of noise such as whistling or the like is suppressed.

A case, at the door mirror 12A, in which the illuminating device 10A for a vehicle is not assembled to the visor body 22 is shown in FIG. 8C. In a case in which the illuminating device 10A for a vehicle is not installed, a cover 156 is used instead of the cover 134. The cover 156 differs from the cover 134 with regard to the point that the illumination hole 140 is not provided. Further, a bracket 158 is connected to the cover 156. For example, one end side of the bracket 158 is connected to the inner surface of the cover 156. A through-hole 158A, which corresponds to the reference pin 42 of the visor body 22, and an insert-through hole 158B, which faces the screw hole 42A, are formed in the other end side of the bracket 158.

In a case in which the illuminating device 10A for a vehicle is not assembled, the lower visor cover 130 is assembled to the visor body 22 in a state in which the cover 156 is fit into the opening portion 132 so as to cover the opening portion 132. At this time, at the lower visor cover 130, the through-hole 36A and the through-hole 158A that is formed in the bracket 158 of the cover 156 are made to overlap, and the reference pin 42 is fit therein. Further, the lower visor cover 130 is fixed together with the cover 156 to the visor body 22 due to the screw 42B, which is inserted in order in the insert-through hole 36B and the insert-through hole 158B that is formed in the bracket 158 of the cover 156, being screwed-together with the screw hole 42A of the visor body 22.

As described above, in the present embodiment, as an example, the illumination hole 44 or the illumination hole 140 that opens in a rectangular shape is formed in the lower visor cover. However the shape of the opening of the illumination hole is not limited to rectangular, and may be another shape such as circular or the like. Further, the illumination hole 44 and the like are not limited to a shape in which the respective sides that are formed by the peripheral edge distal end portion are parallel in the vehicle longitudinal direction or in the vehicle transverse direction, and an arbitrary opening may be applied such as, for example, an opening that is formed such that vertices face one another in the vehicle longitudinal direction or the vehicle transverse direction, or the like.

Further, in the above-described present embodiment, the door mirror 12 that has the mirror 30 that serves as the viewing means is applied as an example of the vehicular visual recognition device. However, the vehicular visual recognition device is not limited to the door mirror 12, and may be a fender mirror. Further, at the vehicular visual recognition device, a camera, which serves as an imaging means that captures images of the vehicle rear side, or the like may be provided as the viewing means instead of the outer mirror or together with the outer mirror.

Moreover, in the present embodiment, description is given in which the illuminating device 10, 10A is provided at the vehicular visual recognition device. However, the optical member is not limited to an illuminating device for a vehicle, and an imaging device for a vehicle that is equipped with a camera, which serves as an imaging means, or the like may be used. In this case, an imaging hole, through which the optical axis of the camera passes, is formed at the opening portion.

For example, in a vehicle such as an SUV (Sport Utility Vehicle: a multipurpose vehicle for sporting) or the like in which the driver's seat is higher than in a passenger vehicle, there are cases in which the visibility in the vicinity of the front wheel that is at the side opposite the driver's seat side is poor. An improvement in the visibility is devised by capturing images of the vicinity of the front wheel and displaying the captured images on a monitor within the vehicle cabin. Such an imaging device for a vehicle is provided at the door mirror, and an imaging hole, which opens toward an obliquely front lower side of the vehicle, is formed in the visor cover by the opening portion, and images can be captured through this imaging hole. By applying the present invention to such an imaging device for a vehicle, the generation of noise such as whistling, wind noise, and the like, which is caused by air that flows into the imaging hole while the vehicle is traveling, can be suppressed.

The disclosure of Japanese Patent Application No. 2015-176926 that was filed on Sep. 8, 2015 is, in its entirety, incorporated by reference into the present specification.

The invention claimed is:

1. A vehicular visual recognition device comprising:
a mirror or camera that is mounted to a vehicle body, is disposed at a vehicle exterior and assists viewing by a vehicle occupant of a vehicle;
a body portion in which is formed an opening through which an optical axis of an optical member passes;
an outer peripheral member that is assembled from a vehicle front side and covers the body portion, and in which is formed an opening portion that faces the opening of the body portion and at whose periphery a peripheral wall is provided; and
a wall portion that is provided at the body portion, and that, at a vehicle rear side portion of the opening portion, faces the peripheral wall at a radial direction side of the opening portion,
wherein air which flows into the opening portion is suppressed from flowing between the peripheral wall of the opening portion and the wall portion.

2. The vehicular visual recognition device of claim 1 wherein, at an axial direction side of the opening portion, either the body portion and the peripheral wall of the opening portion face one another, or the outer peripheral member and the wall portion of the body portion face one another, or the body portion and the peripheral wall of the opening portion face one another and the outer peripheral member and the wall portion of the body portion face one another.

3. The vehicular visual recognition device of claim 1, wherein one of the peripheral wall or the wall portion is provided as a plurality, and another of the peripheral wall or the wall portion faces the one of the peripheral wall or the wall portion at radial direction both sides of the opening portion.

4. The vehicular visual recognition device of claim 1, wherein a communication hole that communicates a lowermost end of the body portion interior and the body portion exterior is formed.

5. The vehicular visual recognition device of claim 1, wherein the wall portion is provided on a bottom surface of the body portion and contacts the peripheral wall.

6. The vehicular visual recognition device of claim 1, wherein the interface between the wall portion of the body portion at the vehicle rear side portion of the opening portion and the peripheral wall of the outer peripheral member defines a bent flow path that suppresses air flow through the interface.

7. A vehicular visual recognition device comprising:
a mirror or camera that is mounted to a vehicle body, is disposed at a vehicle exterior and assists viewing by a vehicle occupant of a vehicle;
a body portion in which is formed an opening through which an optical axis of an optical member passes;
an outer peripheral member that is provided at an outer periphery, and in which an opening hole is formed;
an outer peripheral part that covers the opening hole, and in which is formed an opening portion that faces the opening of the body portion and at whose periphery a peripheral wall is provided; and
a wall portion that is provided at the body portion, and that, at a vehicle rear side portion of the opening portion, faces the peripheral wall at a radial direction side of the opening portion,
wherein air which flows into the opening portion is suppressed from flowing between the peripheral wall of the opening portion and the wall portion.

8. The vehicular visual recognition device of claim 7, wherein, at an axial direction side of the opening portion, either the body portion and the peripheral wall of the opening portion face one another, or the outer peripheral member and the wall portion of the body portion face one another, or the body portion and the peripheral wall of the opening portion face one another and the outer peripheral member and the wall portion of the body portion face one another.

9. The vehicular visual recognition device of claim 7, wherein one of the peripheral wall or the wall portion is provided as a plurality, and another of the peripheral wall or the wall portion faces the one of the peripheral wall or the wall portion at radial direction both sides of the opening portion.

10. The vehicular visual recognition device of claim 7, wherein a communication hole that communicates a lowermost end of the body portion interior and the body portion exterior is formed.

11. The vehicular visual recognition device of claim 7, wherein the wall portion is provided on a bottom surface of the body portion and contacts the peripheral wall.

12. The vehicular visual recognition device of claim 7, wherein the interface between the wall portion of the body portion at the vehicle rear side portion of the opening portion and the peripheral wall of the outer peripheral member defines a bent flow path that suppresses air flow through the interface.

* * * * *